(12) United States Patent
Kuo

(10) Patent No.: US 6,712,223 B2
(45) Date of Patent: Mar. 30, 2004

(54) CD ORGANIZATION DEVICE

(76) Inventor: Hsin-Wen Kuo, 18F.-1., No. 131., Shinjuang 1st Rd., Kaohsiung (TW)

( * ) Notice: Subject to any disclaimer, the term of this patent is extended or adjusted under 35 U.S.C. 154(b) by 0 days.

(21) Appl. No.: 10/187,172

(22) Filed: Jul. 2, 2002

(65) Prior Publication Data

US 2004/0004045 A1 Jan. 8, 2004

(51) Int. Cl.[7] .............................................. A47G 29/00
(52) U.S. Cl. ...................................................... 211/40
(58) Field of Search .......................... 211/40, 194, 41.1, 211/41.12, 43, 175

(56) References Cited

U.S. PATENT DOCUMENTS

| | | | | |
|---|---|---|---|---|
| 2,278,214 A | * | 3/1942 | Pearson | 211/40 |
| 2,665,962 A | * | 1/1954 | Truesdell | 312/9.48 |
| 2,922,527 A | * | 1/1960 | Finn | 211/40 |
| 3,266,688 A | * | 8/1966 | Sefton | 294/158 |
| 5,669,494 A | * | 9/1997 | Geffen | 358/1.15 |

* cited by examiner

Primary Examiner—Alvin Chin-Shue
Assistant Examiner—Sarah Purol

(57) ABSTRACT

A CD organization device includes a telescopic component and two supports. The user can take the target disc by using the telescopic component and a location disc. A horizontal fixed component is on the upper side and lower side, respectively, of two supports and a vertical fixed component is on the outer surface of the two supports. Using the horizontal fixed component or the vertical fixed component allows two CD organization devices to be combined horizontally or vertically.

6 Claims, 12 Drawing Sheets

CD ORGANIZATION DEVICE

BACKGROUND OF THE INVENTION

1. Field of the Invention

The present invention relates to a CD organization device. The CD organization device has telescopic components.

2. Description of the Prior Art

In recent years, computer use has developed from simple word processing to multimedia tasks. The capacity of traditional the diskette is too small to save the digital data. Consequently, the compact disc (CD) replaced the traditional diskette as an important storage medium. Although the capacity of a CD-R has already reached 850 MB, the computer user also needs many CDs to save data. Moreover, the digital data always is sold using several discs, such as video disc, game disc and etc. Because there are more and more CDs, the customers need a CD organization box or a CD-shelf.

Please refer to FIG. 1. FIG. 1 is a prior CD organization device. The prior CD organization device 10 is composed of a seat 12, a vertical rod 14, and a lid 16. Thereof, the vertical rod 14 mounts on the seat 12. The overlapping CDs are pierced through by the vertical rod 14, and put on the seat 12. This CD organization device can economize the space of the package. The prior CD organization device has at least the following shortcomings:

1. There is only one way to put the CD in the device. The overlapping CDs are pierced through by the vertical rod 14, and put on the seat 12. The vertical rod 14 can prevent CD 20 from moving. Furthermore, this CD organization device 10 cannot lie on its side and be stacked with other devices. Consequently, the prior CD organization device 10 cannot increase utility of space.
2. It's hard to take the target disc from the device. First, all the discs that are above the target disc must be removed. After taking the target disc, all discs must be again pierced through by the vertical rod. The user will waste time if the target disc is put at the bottom of all the CDs. It is also hard to search for the target disc in a pile of CDs in the prior CD organization device.

SUMMARY OF THE INVENTION

A primary object of the present invention is to provide a CD organization device that has a telescopic component. The telescopic component cooperates with location disc for the user can take the target disc easily.

Another object of the present invention is to provide a horizontal fixed component and a vertical fixed component. The CD organization device can combine with another CD organization device by the horizontal fixed component or the vertical fixed component.

To achieve the above and other objects, the CD organization device of the present invention includes a telescopic component and two supports. Furthermore, the telescopic component comprises two independent tubes. Two independent tubes vertically install on two individual supports. The outer tube can piece through the central hole of a CD.

Afterwards, the horizontal fixed component installs individually on the upper side and lower side of the supports. Besides, the vertical fixed component installs individually on the outer surface of the supports. The outer surface of the vertical fixed component and the surface, which are installed the tube, are opposite.

BRIEF DESCRIPTION OF THE DRAWINGS

The structure and technical means adopted by the present invention achieves the above and the objects can be best understood by referring to the following detailed description of the preferred embodiments and the accompanying drawings, wherein.

DETAILED DESCRIPTION OF THE PREFERRED EMBODIMENTS

Figure 1:
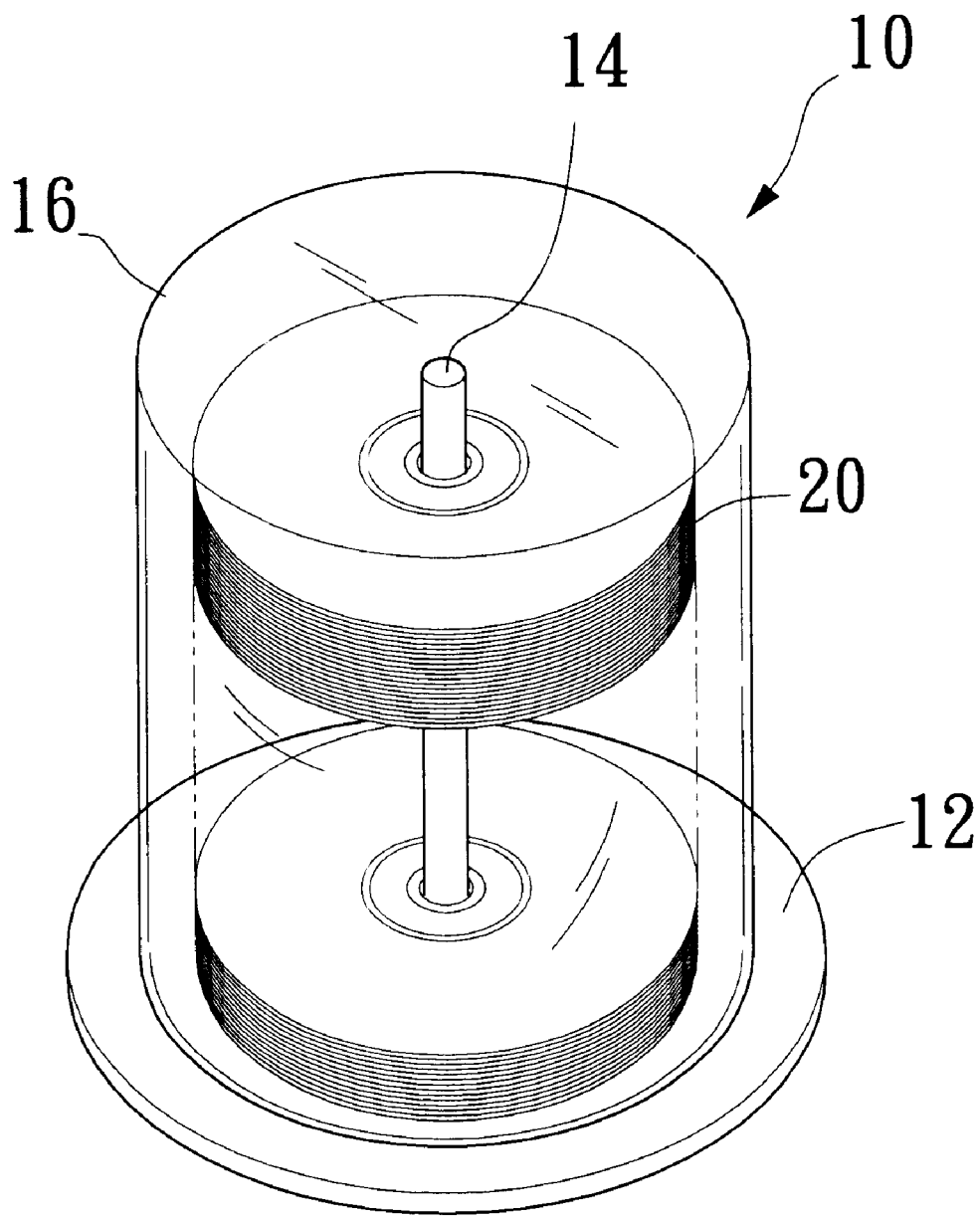
FIG. 1 is a diagram of the prior CD organization device.
Figure 2:
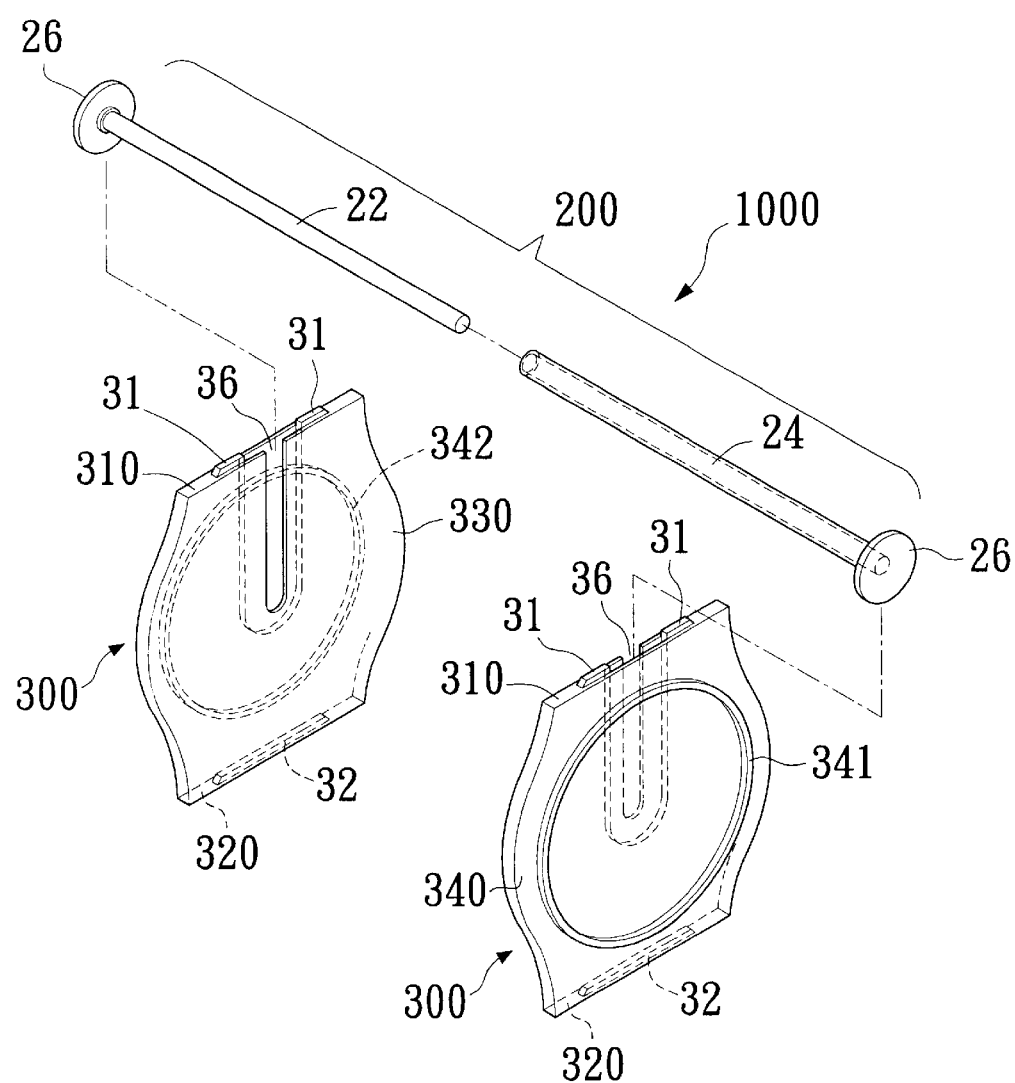
FIG. 2 is an exploded diagram of the present invention.

Please refer to FIG. 2, which is an exploded diagram of the present invention. This present invention includes a telescopic component and two supports. The telescopic component 200 composes an inner tube 22 and an outer tube 24. The outer tube 24 is a hollow tube. The outside diameter of the outer tube 24 is smaller than the central hole of a CD, and the inside diameter of the outer tube 24 is a little larger than the outside diameter of the inner tube 22. Thereof, the inner tube 22 can fit into the outer tube 24 to become the telescopic component 200. Because the outside diameter of the outer tube 24 is smaller than the central hole of a CD, the CD can shift on and be pierced through by the outer tube 24. The inner tube 22 and the outer tube 24 are individually mounted on respective sliders 26. The tubes can be vertically fixed on the supports 300 by using the slider 26.

A grooving 36 is in the middle of a lateral side 310 of the supports 300. The grooving 36 allows the inner tube 22 and the outer tube 24 to be individually mounted on the inner surface 330 of the supports 300 by using slider 26.

Horizontal fixed components are on the lateral side 310 and lower side 320 of the two supports 300. The upper, lateral side 310 of the two supports 300 has a tenon 31. A mortise 32 is on the lower side of the two supports 300. Two CD organization devices can be combined by i.e., stacked, using the tenon 31 and the mortise 32.

A vertical fixed component is installed on the outer surface 340 of the two supports 300. Furthermore, the outer surface of the vertical fixed component and the surface, which is installed the telescopic components 200, are opposite. An outer protuberant ring 341 and an inner protuberant ring 342 are individually installed on the respective surfaces 330, 340 of the two supports 300. Two CD organization devices can be combined by the outer protuberant ring 341 and the inner protuberant ring 342.

Figure 3:
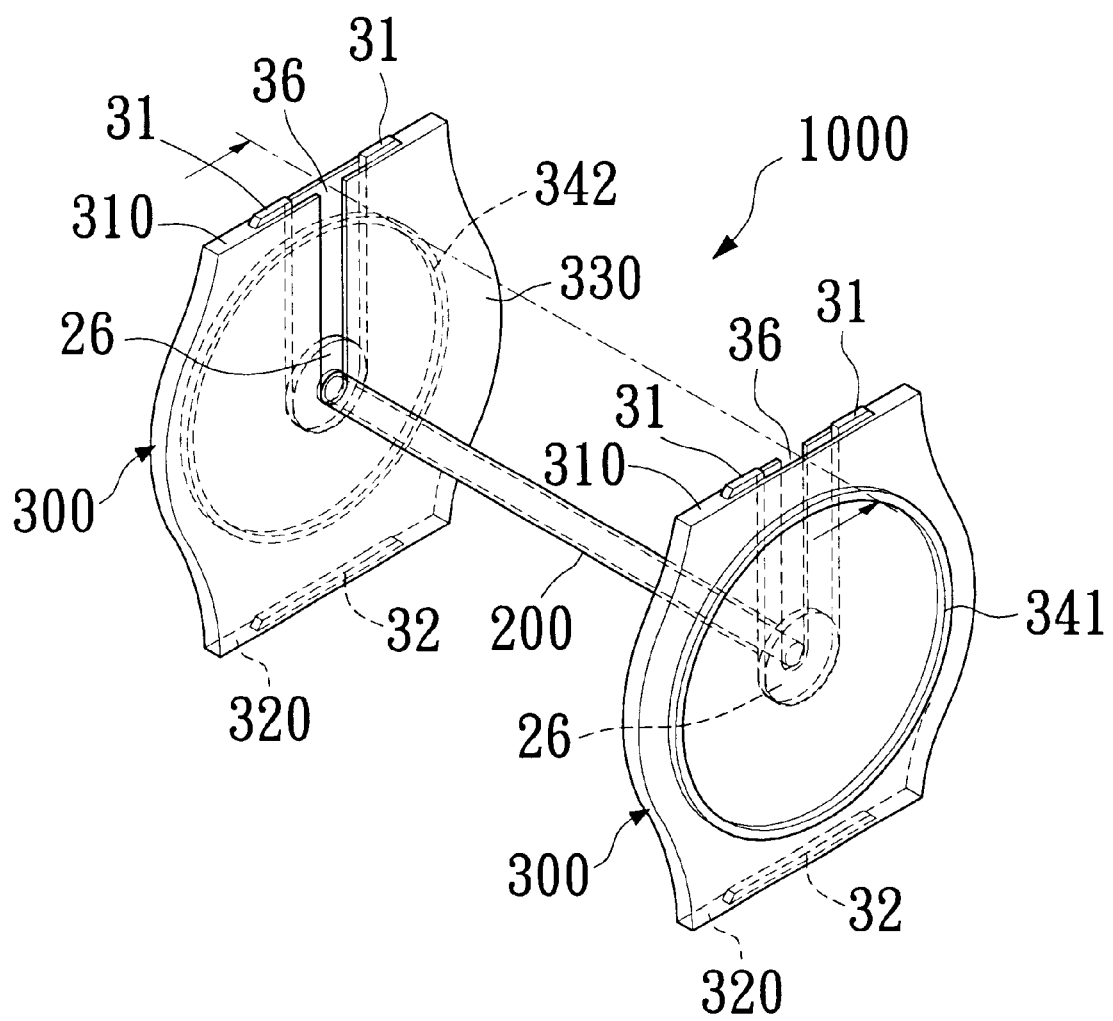
FIG. 3 is an appearance diagram of the present invention.

Please refer to FIG. 3. This is a diagram of the present invention. The sliders 26, on which the inner tube and outer tube are mounted, can fit into the grooving 36. According to the above, the CD organization device 1000 has the telescopic component 200, which crosses between the inner surfaces of two supports 300.

Figure 4:
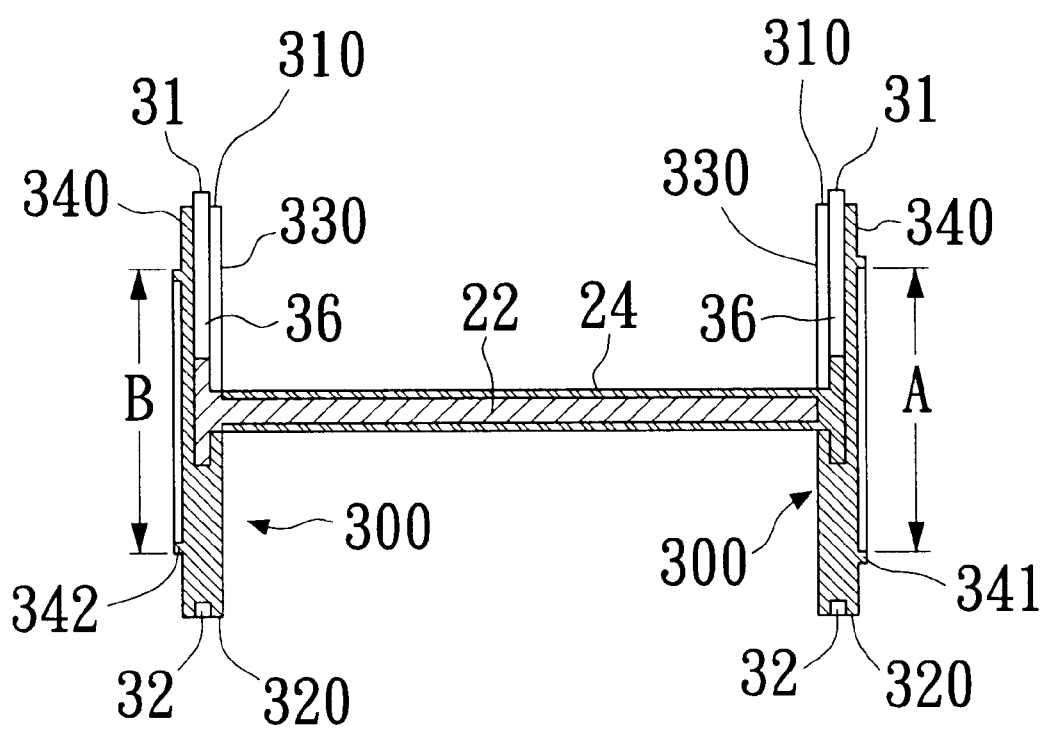
FIG. 4 is a sectional view of the present invention.

Please refer to FIG. 4. This is a sectional view of the present invention. The inner tube 22 and the outer tube 24 are individually installed on two inner surfaces 330 of the two supports 300. Besides, the inner tube 22 can fit into the outer tube 24. The outer protuberant ring 341 and the inner protuberant ring 342 are individually installed on two outer surfaces 340 of two supports 300. Thereof, the outside diameter B of the inner protuberant ring 342 is a little less than the of inside diameter A of the outer protuberant ring 341 (A>B). The inner protuberant ring 342 can fit into the outer protuberant ring 341. Consequently, two CD organization devices can be combined by the outer protuberant ring 341 and the inner protuberant ring 342. Furthermore, the tenons 31 are disposed on the upper side 310 of the two supports 300. A mortise 32 is on the lower side of the two supports 300. Two CD organization devices also can be combined by the tenon 31 and the mortise 32.

Figure 5:
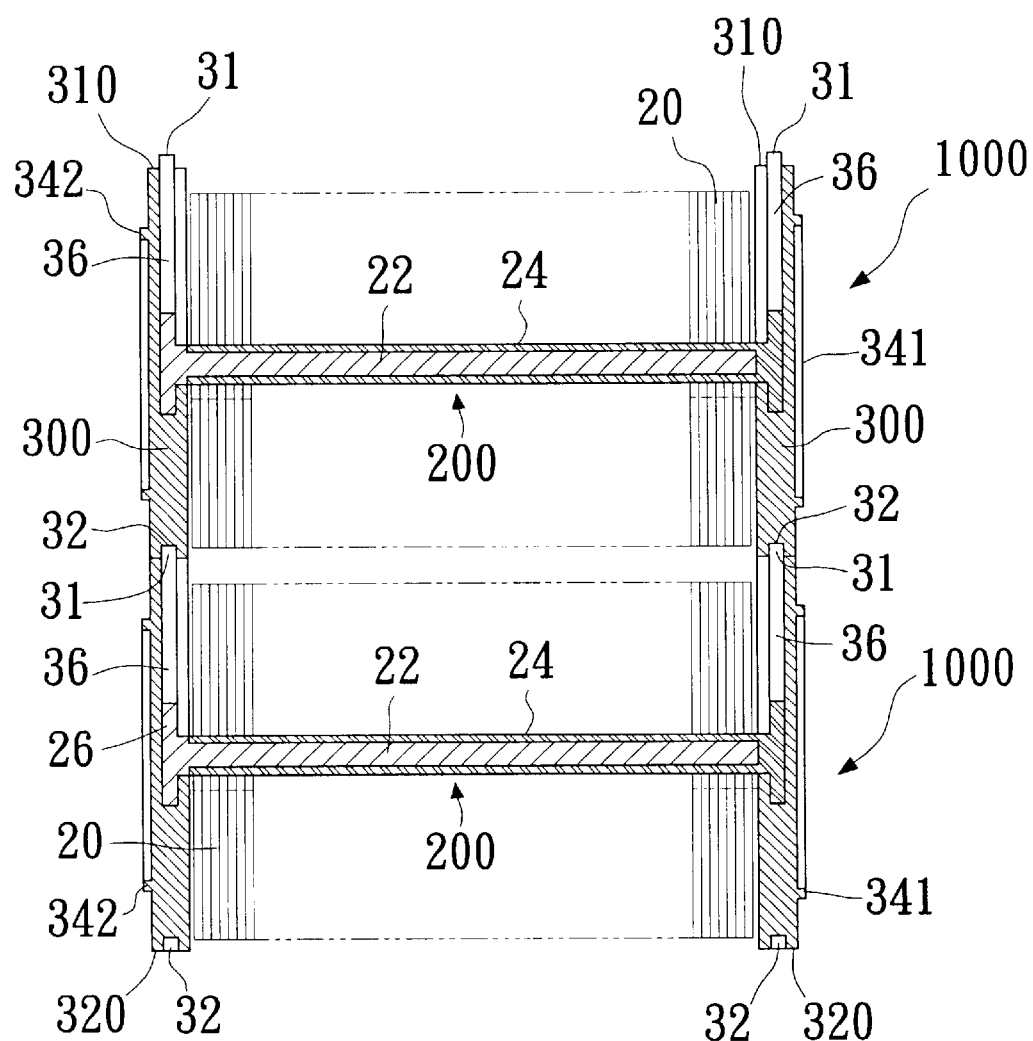
FIG. 5 is the horizontal combined diagram of two CD organization devices.

Please refer to FIG. 5. FIG. 5 is a horizontal combined diagram of two CD organization devices. The tenon 31, on the upper side 310 of the support 300, can fit into the mortise 32, on the lower side 320 of the support 300. Using the tenon 31 and the mortise 32, two CD organization devices can be combined.

Figure 6:
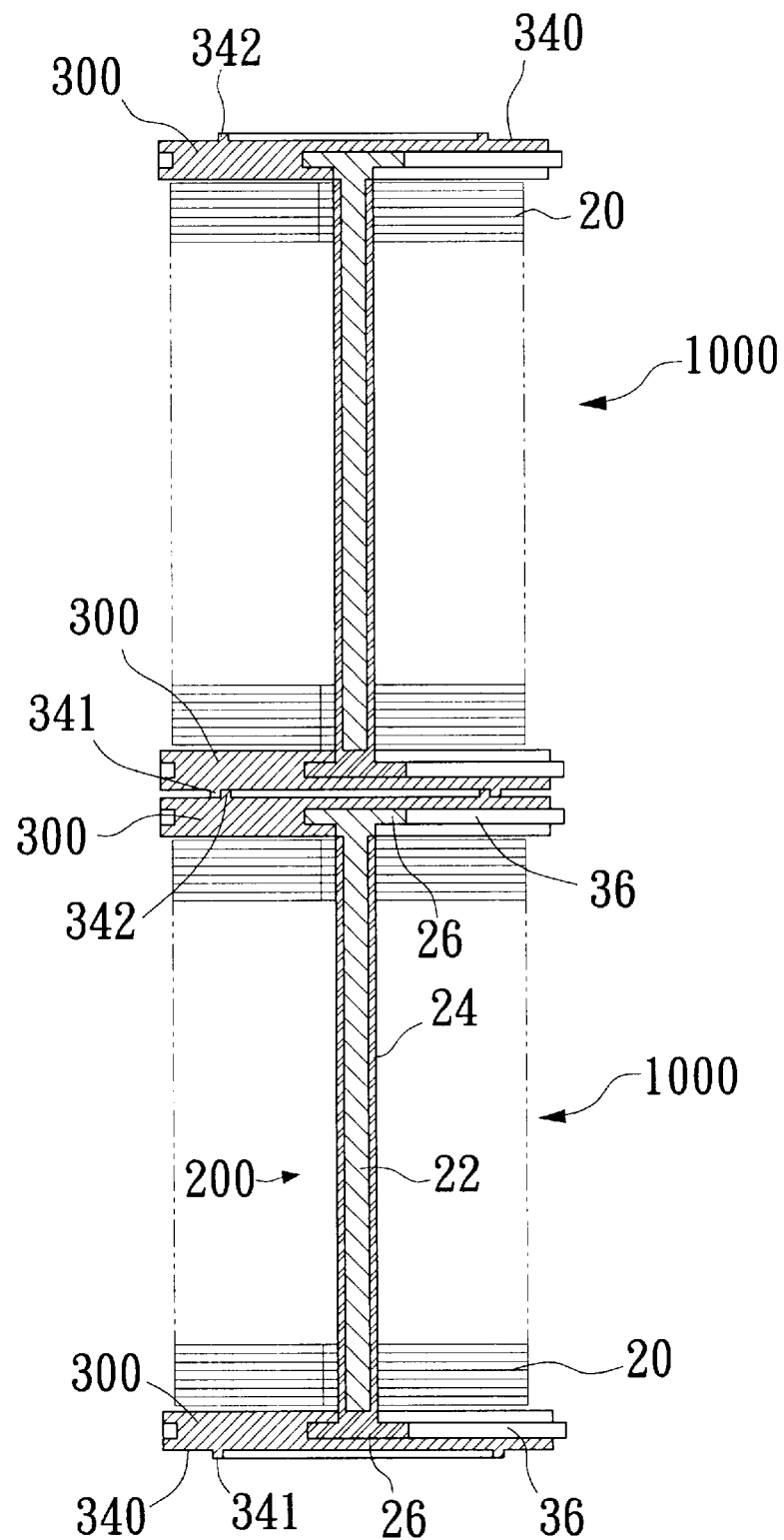
FIG. 6 is the vertical combined diagram of two CD organization devices.
Figure 7:
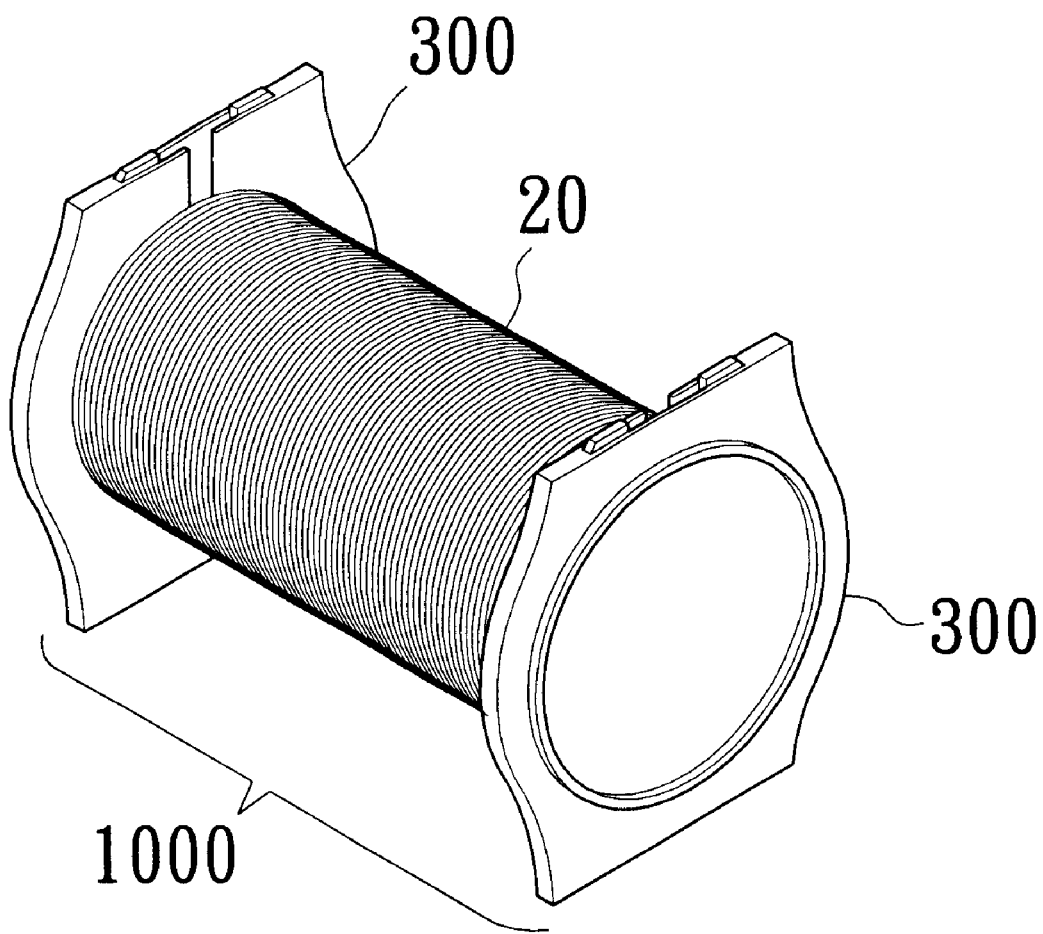
FIG. 7~FIG. 12 are the diagrams of the present invention in use.
Figure 8:
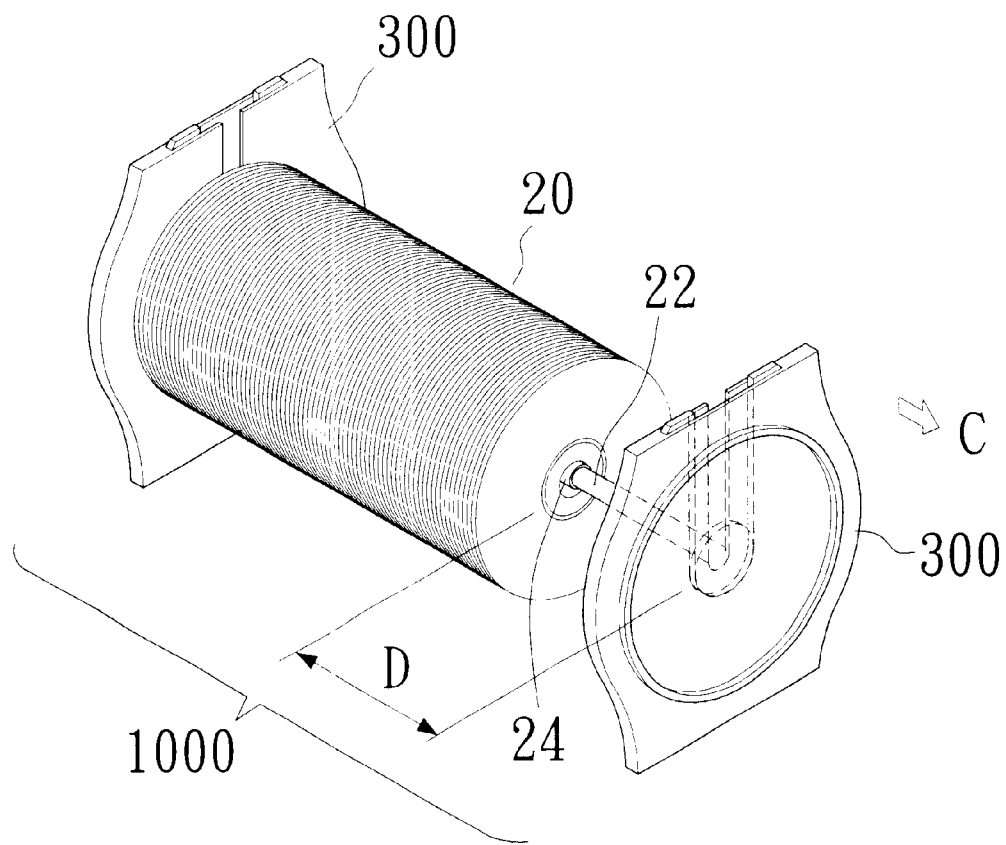
Figure 9:
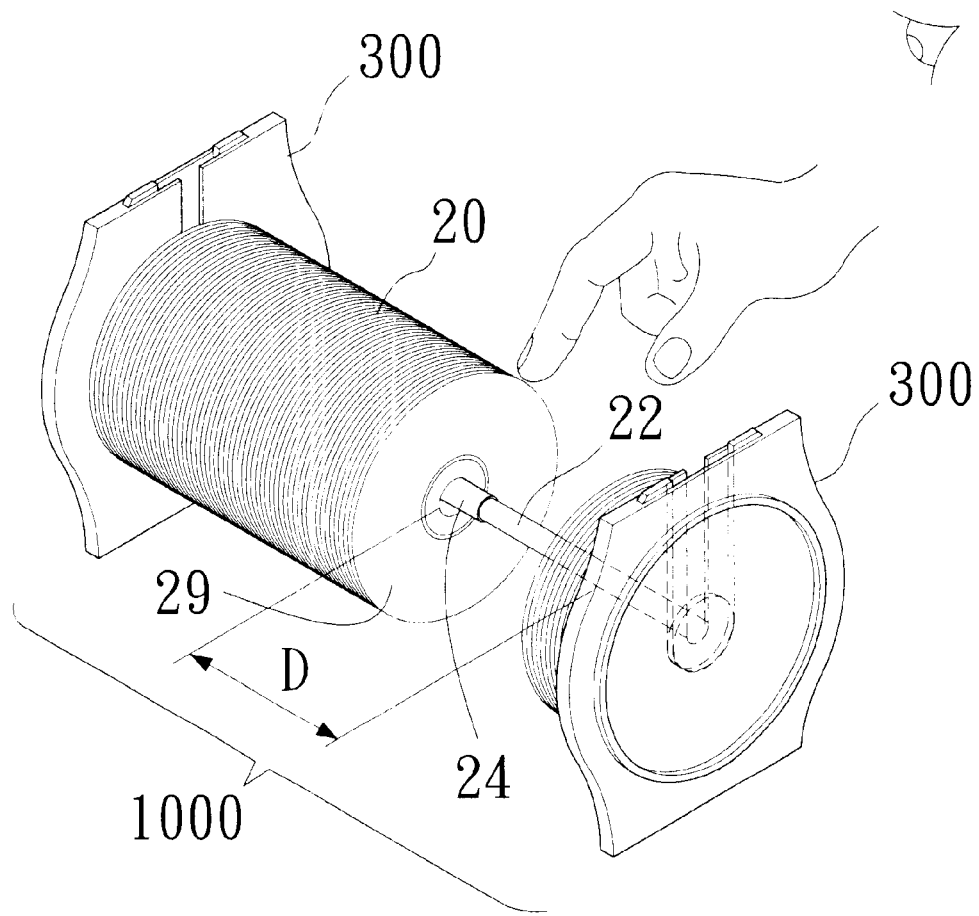
Figure 10:
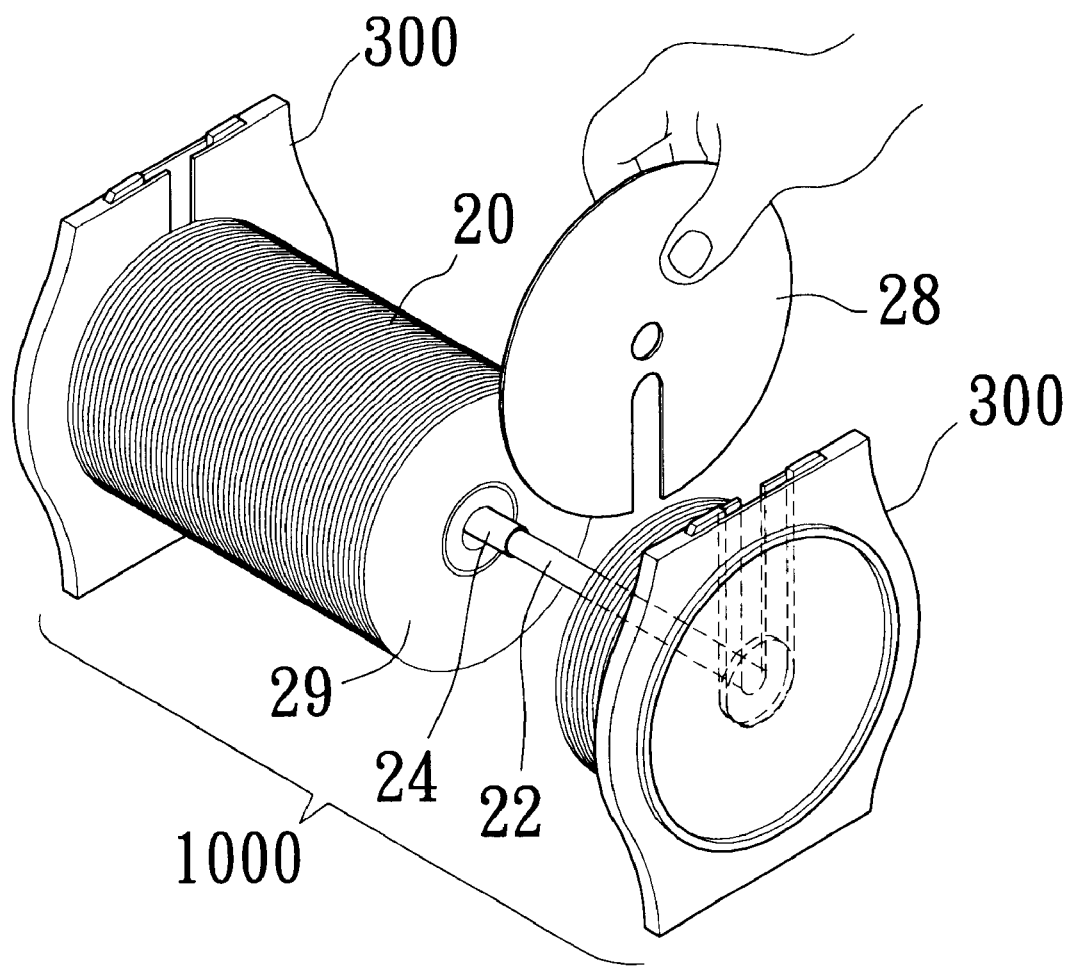
Figure 11:
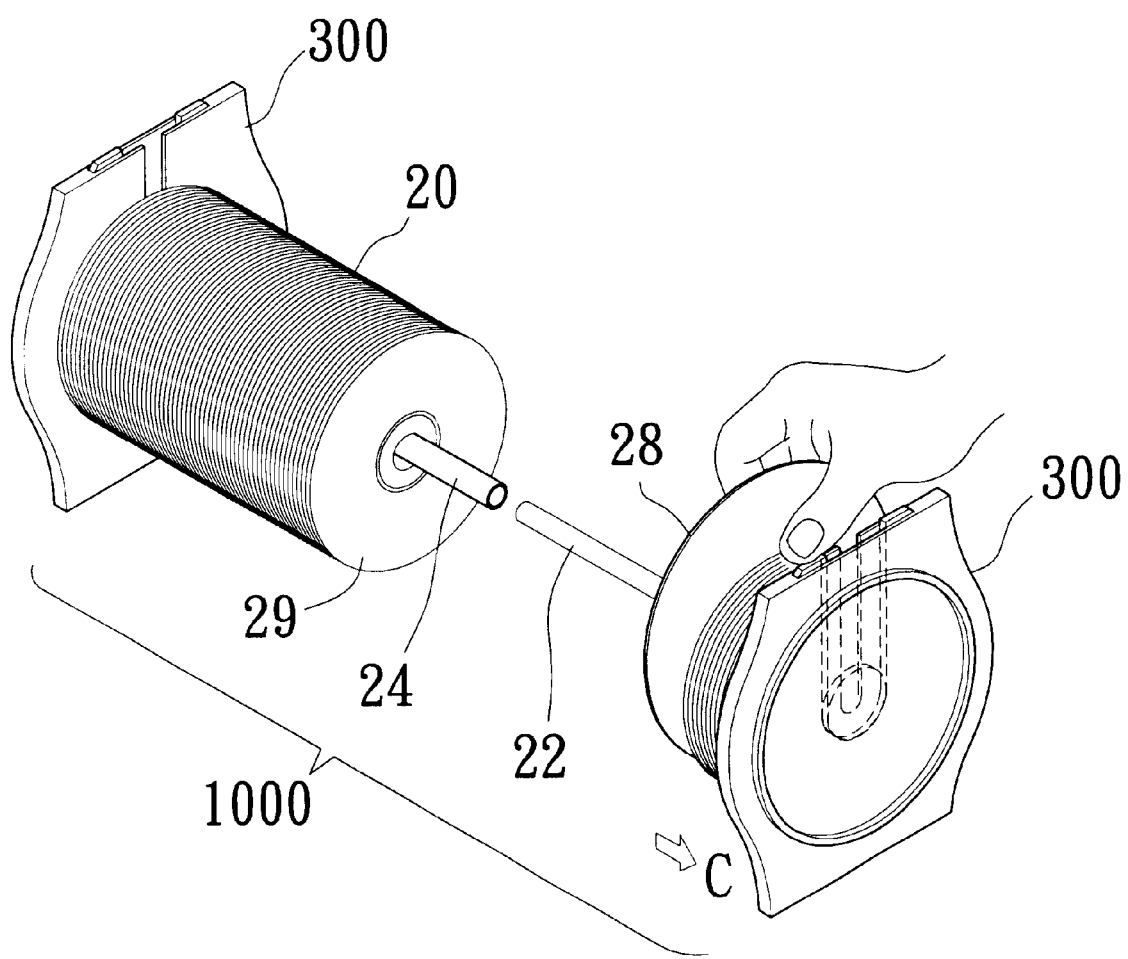
Figure 12:
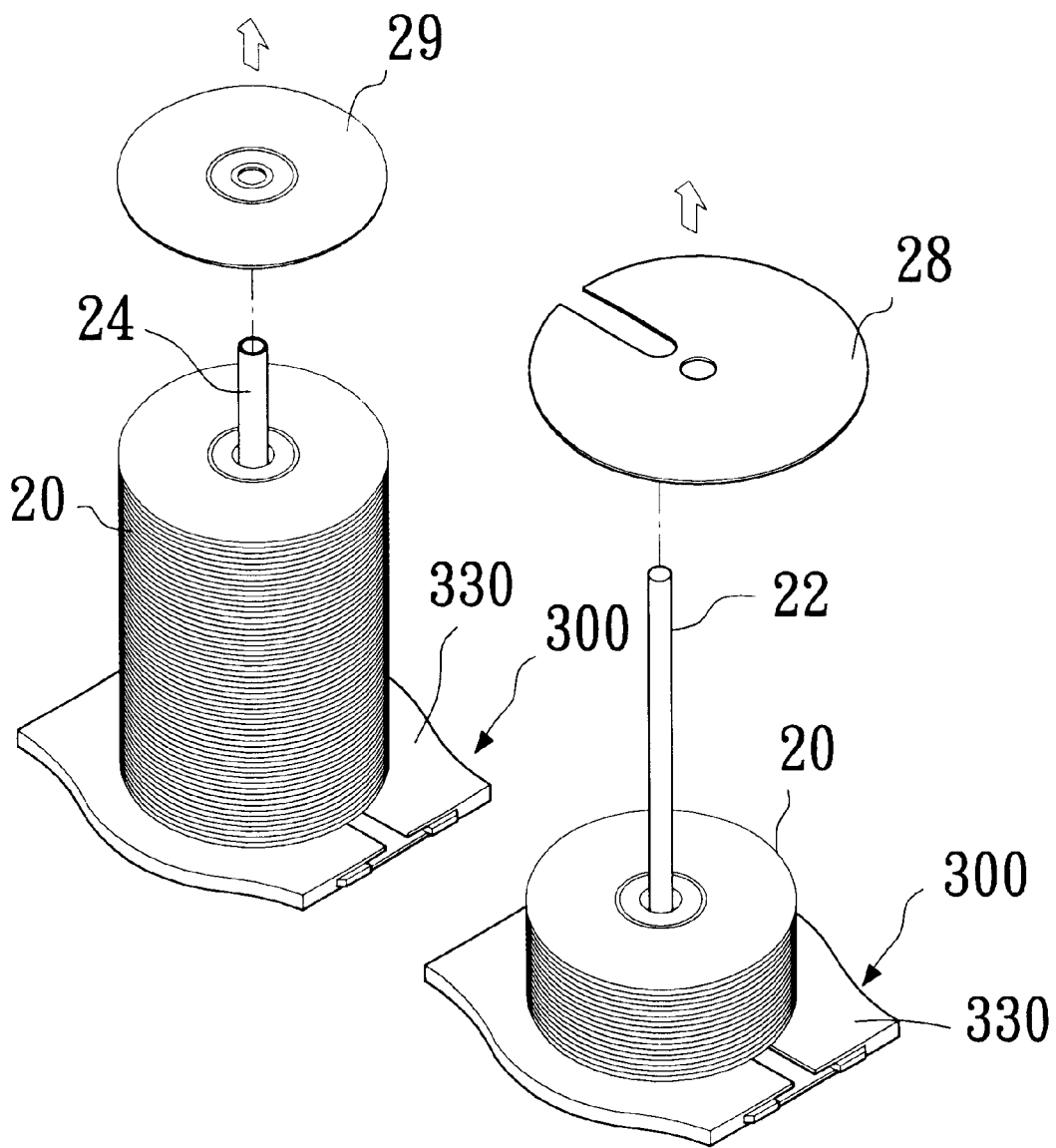

Please refer to FIG. 6. This is a vertical combined diagram of two CD organization devices. Using the outer protuberant ring 341, which is on the outer surface 340 of the support 300, and the inner protuberant ring 342, which is on the outer surface 340 of another support 300, two CD organization devices can be combined.

Please refer to FIG. 7~FIG. 12. FIG. 7~FIG. 12 are diagrams of the present invention in use. First, one support 300 is pulled in the C direction. A space D is formed between the support 300 and the CD 20. (see FIG. 8) The user can find the target disc 29 by using this space D. (see FIG. 9) If the user find the target disc 29, a location disc 28 is put in this space D. (see FIG. 10) The support 300 Is pulled in the C direction by using the location disc 28 and then the telescopic component is divided into the inner tube 22 and the outer tube 24. (see FIG. 11) Finally, the target disc 29 will be on the outer tube 24 that is installed on the inner surface 330 of the support 300. The user can take the target disc 29 easily. After taking the target disc 29, the location disc 28 is removed from the inner tube 22. (see FIG. 12) The CD organization device can then be returned to the original configuration, by fitting the inner tube 22 into the outer tube 24. (see FIG. 7)

With the above arrangement, the CD organization device of the present invention comprises a telescopic component and two supports. Besides, the telescopic component is divided into two independent tubes. The user can take the target disc easily by using a location disc. It also can prevent the record side of a CD from becoming dirty from fingerprints. Furthermore, the horizontal fixed component installs individually on the upper side and lower side of the supports and the vertical fixed component also installs individually on the outer surface of the supports. Two CD organization devices can be combined by the horizontal fixed component or the vertical fixed component.

The present invention has been described with a preferred embodiment thereof and it is understood that many changes and modifications in the described embodiment can be carried out without departing from the scope and the spirit of the invention as defined by the appended claims.

What is claimed is:

1. A CD organization device, comprising:
  a telescopic component divided into two independent tubes that are extendible relative to each other and that can pierce through a central hole of a CD, said two independent tubes including a hollow outer tube and an inner tube that is slidably receivable within said outer tube, said outer tube having an inside diameter that is greater than an outside diameter of said inner tube; and
  two supports, each having an inner surface, with the inner surface of one of said supports being mounted on an end of said outer tube, and the inner surface of another one of said supports being mounted on an end of said inner tube, so that the two supports are vertical, and so that a distance between said two supports may be varied by sliding said inner tube relative to said outer tube.

2. A CD organization device as claimed in claim 1, wherein the inner surface of each support has a groove formed therein, that extends from an upper edge of the support toward a center of the support, and wherein each respective end of said telescopic component has a respective slider attached thereon, each slider being slidably received within a respective groove so as to vertically mount said supports to said telescopic component.

3. A CD organization device as claimed in claim 1, wherein one of an upper edge and a lower edge of each support has a tenon disposed thereon, and another one of the upper edge and the lower edge of each support has a mortise formed therein, whereby two CD organization devices can be combined horizontally by stacking the the CD organization devices, with the respective tenons of one of the CD organization devices being received within the respective mortises of the other CD organization device to fix the two CD organization devices relative to each other.

4. A CD organization device as claimed in claim 1, wherein an outer surface of one of said supports has an outwardly protruding ring disposed thereon, and an outer surface of another one of said supports has an inwardly protruding ring formed therein, whereby two CD organization devices can be combined vertically by stacking the CD organization devices so that the two CD organization devices are immediately adjacent to each other, with the outwardly protruding ring of one of said CD organization devices being received within the respective inwardly protruding ring of the other CD organization device to fix the two CD organization devices end-to-end and relative to each other.

5. A CD organization device as claimed in claim 1, further comprising a location disc, said location disc preventing the CDs from shifting and preventing the CDs from becoming dirty from fingerprints.

6. A CD organization device as claimed in claim 3, wherein an outer surface of one of said supports has an outwardly protruding ring disposed thereon, and an outer surface of another one of said supports has an inwardly protruding ring formed therein, whereby two CD organization devices can be combined vertically by stacking the CD organization devices so that the two CD organization devices are immediately adjacent to each other, with the outwardly protruding ring of one of said CD organization devices being received within the respective inwardly protruding ring of the other CD organization device to fix the two CD organization devices in an end-to-end relationship.

* * * * *